US006342853B1

(12) United States Patent
Kalafus et al.

(10) Patent No.: US 6,342,853 B1
(45) Date of Patent: *Jan. 29, 2002

(54) SYSTEM FOR USING DIFFERENTIAL GPS RECEIVERS WITH AUTOPILOT SYSTEMS FOR CATEGORY III PRECISION APPROACHES

(75) Inventors: Rudolph M. Kalafus, Los Gatos; Paul Braisted, San Jose, both of CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,521

(22) Filed: Apr. 15, 1999

Related U.S. Application Data

(63) Continuation of application No. 08/932,323, filed on Sep. 17, 1997, now Pat. No. 5,945,943.

(51) Int. Cl.$^7$ ................................................. G01S 5/02
(52) U.S. Cl. ..................... 342/357.03; 342/33; 701/215
(58) Field of Search ............................. 342/357.03, 33; 701/215

(56) References Cited

U.S. PATENT DOCUMENTS

| | | | |
|---|---|---|---|
| 5,361,212 A | * | 11/1994 | Class et al. ................. 364/428 |
| 5,702,070 A | * | 12/1997 | Waid ........................... 244/183 |
| 5,786,773 A | * | 7/1998 | Murphy ....................... 340/947 |
| 5,945,943 A | * | 8/1999 | Kalafus et al. ............. 342/357 |

* cited by examiner

Primary Examiner—Mark Hellner
(74) Attorney, Agent, or Firm—Wagner, Murabito & Hao LLP

(57) ABSTRACT

A precision approach capable dual differential global positioning system (DGPS) receiver avionics system. The system of the present invention includes a first and a second DGPS receiver. The first and second DGPS receivers are both adapted to interface with an autopilot in an aircraft. The DGPS receivers each determine the position of the aircraft as the aircraft proceeds along a flight path. Both DGPS receivers are further adapted to employ carrier aiding to smooth the code phase measurements used in determining the position of the aircraft. Within a predetermined range along the approach path of the aircraft and when the output of the first DGPS receiver and the output of the second DGPS receiver are proximate within a predetermined distance, the DGPS receivers determine a transition point. After the transition point, the DGPS receivers utilize DGPS carrier phase tracking to determine the position of the aircraft relative to its position at the transition point. The low noise characteristics of the carrier phase tracking allows the DGPS receivers to properly interface with the autopilot of the aircraft.

34 Claims, 10 Drawing Sheets

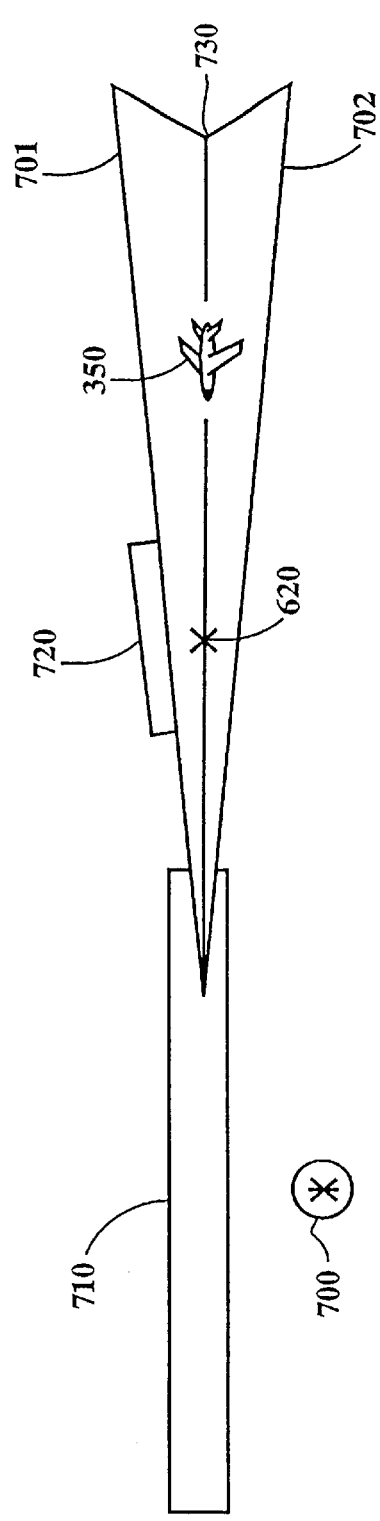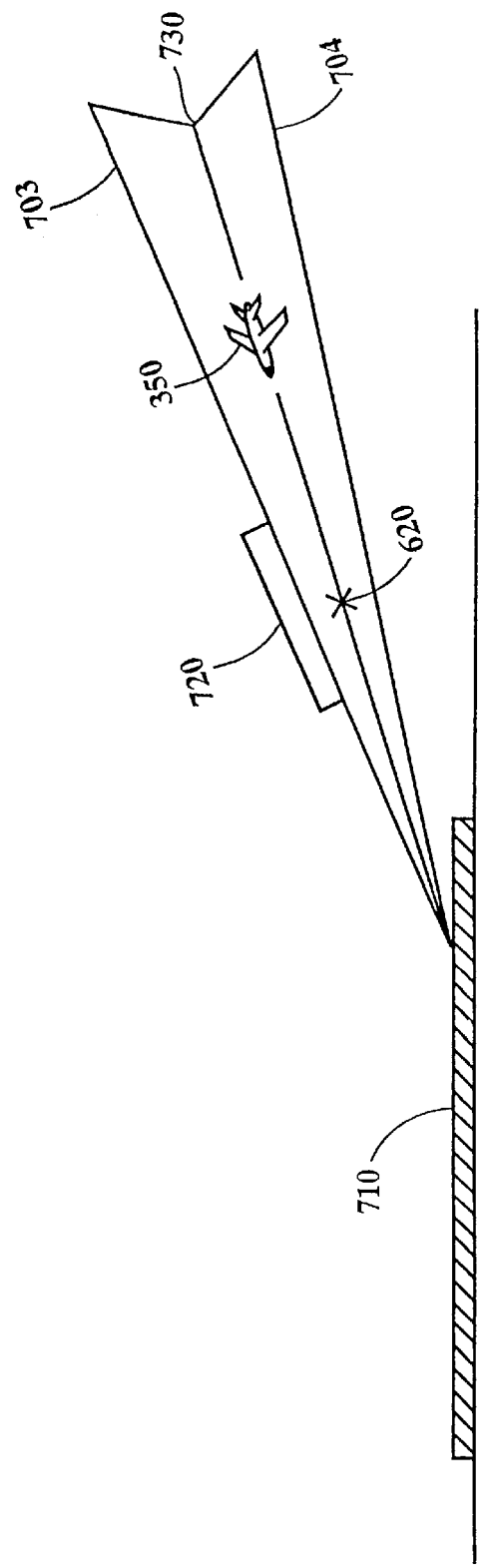
FIG. 7A
FIG. 7B

SYSTEM FOR USING DIFFERENTIAL GPS RECEIVERS WITH AUTOPILOT SYSTEMS FOR CATEGORY III PRECISION APPROACHES

This is a continuation of application Ser. No. 08/932,323 filed on Sep. 17,1997 now U.S. Pat. No. 5,945,943 which is hereby incorporated by reference to this specification

TECHNICAL FIELD

The present invention relates generally to aviation navigation systems and more specifically to a system for using differential global positioning system (DGPS) receivers to replace dual instrument landing system (ILS) receivers for use with autopilot systems for Category III precision approaches.

BACKGROUND ART

The aviation industry relies upon numerous navigation aids in order to safely take off, navigate enroute, and land aircraft. Among these, the instrument landing system (ILS) is the internationally accepted and standardized navigation aid for landing aircraft at properly equipped airports. GPS, however, is increasingly being accepted as an alternative to traditional navigation aids, including even ILS.

Essentially, GPS is a space based radio positioning network for providing users equipped with suitable receivers highly accurate position, velocity, and time (PVT) information. Developed by the United States Department of Defense (DOD), the space based portion of GPS comprises a constellation of GPS satellites in non-geosynchronous orbits around the earth.

FIG. 1 shows the constellation 100 of GPS satellites 101 in orbit. The GPS satellites 101 are located in six orbital planes 102 with four of the GPS satellites 101 in each plane, plus a number of on orbit spare satellites (not shown) for redundancy. The orbital planes 102 of the GPS satellites 101 have an inclination of 55 degrees relative to the equator and an altitude of approximately 20,200 km (10,900 miles) and typically complete an orbit in about 12 hours. This positions each of the GPS satellites 101 in such a manner that a minimum of five of the GPS satellites 101 are normally observable (above the horizon) by a user anywhere on earth at any given time.

The orbiting GPS satellites 101 each broadcast spread spectrum microwave signals encoded with positioning data. The signals are broadcast on two frequencies, L1 at 1575.42 and L2 at 1227.60, with the positioning data modulated using bi-phase shift keying techniques. A user receives the signals with a GPS receiver. The GPS receiver is adapted to demodulate the positioning data contained in the signals. Using the positioning data, the GPS receiver is able to determine the distance between the GPS receiver and a corresponding transmitting GPS satellite. By receiving signals from several of the GPS satellites 101 and determining their corresponding range, the GPS receiver is able to determine its position and velocity with a greater accuracy than conventional radio navaids.

Applications of CPS to aircraft navigation are currently partitioned into two main areas. The first area includes the en route terminal, and non-precision approach phases of flight. The second area is the precision approach phase of flight. This is a natural partition for both historical and practical reasons. The GPS signals commonly available to civilian users are referred to as the standard positioning service (SPS). The accuracy of SPS is specified by DOD to be within 100 meters horizontal positioning accuracy 95% of the time and 300 meters 99.99% of the time. The 100 meter accuracy specification currently is sufficient, i.e., at least as accurate or better than current approved navigation systems, for all phases of flight down to and including non-precision approaches. SPS, however, is not sufficiently accurate for vertical guidance in the precision approach phase of flight.

The lateral and vertical navigation sensor accuracies for precision approach traditionally have been based on three categories of approach:

Category I (CAT-I), Category II (CAT-II), or Category III (CAT-III). A precision approach is where an aircraft relies primarily upon instruments for landing, due to bad weather or other constraints. The operational definitions of these categories are based on visibility (runway visual range) and landing decision height. Category III has the most stringent requirements, including very stringent equipment redundancies, lateral guidance in roll out for Category IIIb and Category IIIc, and other requirements. Table 1 below summarizes the requirements specified by the traditional categories.

TABLE 1

Traditional categories of precision approach

| Category | Runway visual range | Decision height |
|---|---|---|
| CAT-I | 1800–2400 ft | 200 ft |
| CAT-II | 1200 ft | 100 ft |
| CAT-IIIa | >700 ft | <100 ft |
| CAT-IIIb | 150–700 ft | <50 ft |
| CAT-IIIc | <150 ft | 0 ft |

FIG. 2A shows a schematic diagram a down view of an airport runway 20 relative to a flight path 21 of an aircraft 22, and FIG. 2B shows a corresponding side view. The aircraft 22 has executed a CAT-II approach. The aircraft 22 follows a glide slope as it approaches the runway 20, creating a flight path 21. A decision height is that height above the runway at which aircraft 22 must declare a missed approach if the runway is not yet in view. In the present example, a CAT-II approach, required RVR 24 is 1200 ft and the required decision height 25 is 100 ft above runway 20. Thus, CAT-IIIc allows flight right down to the runway surface (decision height of 0 ft) with potentially zero RVR. As can be expected, requirements for CAT-IIIc approaches are very stringent.

Before GPS can be used by the aviation community for precision approaches, GPS aviation electronics (avionics) need to be certified for these most demanding and flight critical phases of flight. Aircraft flying precision approaches utilize the well known ILS technology. ILS uses a ground based azimuth transmitter (localizer) and a ground based elevation transmitter (glide slope) which define a precision approach flight path to be followed. By employing ILS receivers, a properly equipped aircraft is able to fly down the ILS flight path to land on the runway.

Current CAT-III ILS systems used in newer aircraft employ dual ILS receivers on board the aircraft for added redundancy and fault detection. The aircraft's autopilot compares the outputs of these two receivers, and if they disagree by more than a certain predetermined amount, a fault is declared, and the aircraft must execute a missed approach. The CAT-III ILS systems are routinely accurate to within 2 ft in the vertical dimension at 100 feet above the runway surface. They are required to work under extreme weather conditions and at life-critical levels of performance (for example, the probability of a missed detection of failure not exceeding $5 \times 10^{-9}$). This is the standard at which CAT-III GPS systems are expected to perform.

There are several prior art methods being considered for employing GPS for CAT-III auto landings. One method involves using differential GPS (DGPS) techniques to improve the accuracy and fault detection capability of SPS. DGPS involves placing a local area augmentation system DGPS transmitter near the airport. The transmitter broadcasts DGPS corrections and integrity data to nearby aircraft which use the data to determine their accurate DPGS positions. Although the DGPS positions tend to be sufficiently accurate in the horizontal dimension, they have much less margin in the vertical dimension. In addition, the code phase measurements used in typical prior art DGPS systems tend to be noisy in comparison to ILS determined measurements. Thus, even though DGPS is potentially more accurate overall than ILS, the noise characteristics are such, and the ILS comparison threshold is set so low, that two GPS receivers will disagree enough that a fault would get declared by the autopilot on approximately 50% of the approaches. This is because ILS receivers exhibit very low noise, even though the accuracy of the signal is usually inferior to DGPS. This relationship is illustrated below.

FIG. 2C shows a comparison of the relative accuracy and error characteristics of ILS versus DGPS. Graph 30 shows the angular error of two ILS receivers (e.g., ILS #1 and ILS #2). The vertical direction of graph 30 represents angular error and the horizontal direction represents time. In graph 30, ILS #1 and ILS #2 both begin the approach at zero angular error (e.g., on the left side). As time progresses, as the aircraft proceeds down the approach path toward a runway threshold, the angular error of ILS #1 and ILS #2 vary from zero angular error. This variance, however, is such that ILS #1 and ILS #2 remain within a predetermined upper and lower alarm limit.

Graph 31 shows the total angular distance between ILS #1 and ILS #2, corresponding to graph 30. Thus, even though ILS #1 and ILS #2 vary from zero angular error, the difference between them does not exceed the upper or lower alarm limit (e.g., which would trigger an autopilot fault).

Graph 32 is similar to graph 30 except that, instead of two ILS receivers, two DGPS receivers (e.g., DGPS #1 and DGPS #2) are plotted. Graph 32 shows how even though GPS is much more accurate than ILS when the aircraft is far from the runway threshold, the nature of DGPS is such that, as the aircraft approaches the runway threshold, the angular error of DGPS #1 and DGPS #2 increases. In addition, the angular error of DGPS #1 and DGPS #2 vary independently with respect to each other.

Graph 33 shows the total angular distance between DGPS #1 and DGPS #2. Thus, since the angular error of DGPS #1 and DGPS #2 increases as the aircraft approaches the runway threshold and since their angular error varies independently, the total angular error exceeds the upper and lower alarm limits, causing alarm conditions. Consequently, the autopilot declares a fault and the approach is aborted.

One solution to this problem being considered is the use of carrier phase DGPS techniques. One such prior art technique is the Integrity Beacon Landing System (IBLS) technique. Using IBLS, low power pseudolite transmitters are located on either side of the precision approach flight path to a runway. The pseudolite transmitters broadcast a signal, along with a signal being broadcast from a conventional DGPS transmitter located near the runway, such that an aircraft flying along the precision approach flight path is capable of tracking enough signal sources (GPS satellites and pseudolites) to unambiguously determine a carrier phase DGPS position accurate to within centimeters. Thus, the carrier phase DGPS position is far more accurate than the CAT-III ILS noise thresholds such that two GPS receivers will easily agree by enough margin that a fault will not be declared. The problem with this solution is that it requires expensive construction and maintenance of pseudolite transmitters off of the airport property. In many instances, this can be very expensive.

While in principle, it should merely be a matter of resetting the autopilot threshold, it turns out that doing this would be extremely costly due to enormous amount of testing required for certifying CAT-III standards. The aviation industry wants GPS landing equipment to look just like ILS, behave like ILS, and interface with other aircraft systems just like ILS. For example, aviation industry standard autopilots are designed to interface with dual ILS systems. An ideal solution would interface with industry standard autopilots, use similar hardware and software interfaces, and be subject to similar comparison between dual GPS avionics receivers and perform at a similar level of integrity (e.g., no noise caused autopilot fault declarations).

Thus what is required is a method and system for employing GPS for CAT-III auto landings which do not require locating equipment off of the airport property. What is further required is a method and system for employing GPS which will interface with existing autopilot systems currently installed in the fleet. Such a method and system should not cause an inordinate amount of autopilot fault declarations. What is further desired is a method and system which provides the benefits of GPS while retaining the stringent CAT-III certification standards of prior art dual ILS systems.

DISCLOSURE OF THE INVENTION

A precision approach capable dual differential global positioning system (DGPS) receiver avionics system. The system of the present invention includes a first and a second DGPS receiver. The first and second DGPS receivers are both adapted to interface with an autopilot in an aircraft. The DGPS receivers each determine the position of the aircraft as the aircraft proceeds along a flight path. Both DGPS receivers are further adapted to employ carrier aiding to smooth the code phase measurements used in determining the position of the aircraft. Within a predetermined range along the approach path of the aircraft and when the output of the first DGPS receiver and the output of the second DGPS receiver are proximate within a predetermined distance, the DGPS receivers determine a transition point, wherein the DGPS receivers transition to carrier phase tracking. After the transition point, the DGPS receivers utilize DGPS carrier phase tracking to determine the position of the aircraft. The DGPS receivers are initialized to a common position based on their respective code phase based positions at the transition point. The low noise characteristics of the carrier phase tracking allows the DGPS receivers to properly interface with the autopilot of the aircraft such that the DGPS receivers do not cause an inordinate amount of autopilot fault declarations.

Thus, the present invention provides a method and system for employing GPS for CAT-III auto landings which do not require locating equipment off of the airport property. A conventional DGPS transmitter is located within the bounds of the airport. The present invention further provides a system for employing GPS which will interface with existing autopilot systems currently installed in the fleet. The first and second DGPS receivers are combined into a dual DGPS unit, adapted to fit into the slot occupied by conventional dual ILS systems, and adapted to provide data in the same format as the conventional dual ILS receivers. In addition, the system of the present invention provides a method and system of utilizing GPS and its benefits while retaining the stringent CAT-III certification standards of prior art dual ILS systems.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7A shows a down view of an aircraft flying a CAT-III approach.

FIG. 7B shows a side view of the aircraft flying a CAT-III approach from FIG. 7A.

DETAILED DESCRIPTION OF THE INVENTION

Figure 1:
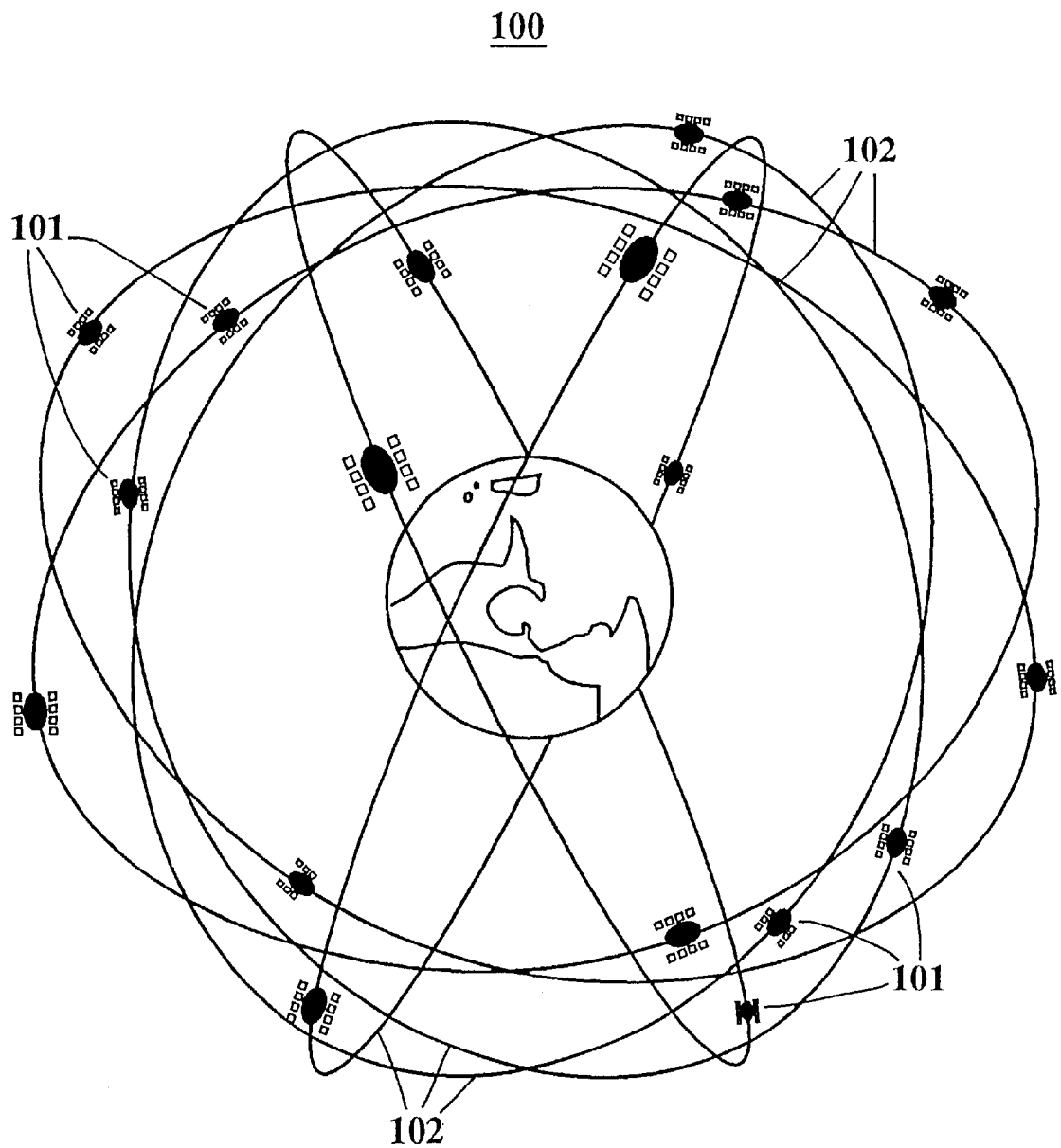
FIG. 1 shows a constellation of GPS satellites in orbit.
Figure 2A:
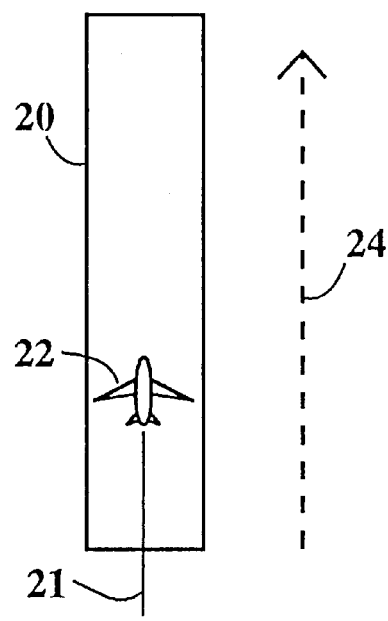
FIG. 2A shows a schematic diagram of a down view of an airport runway relative to the flight path of an aircraft.
Figure 2B:
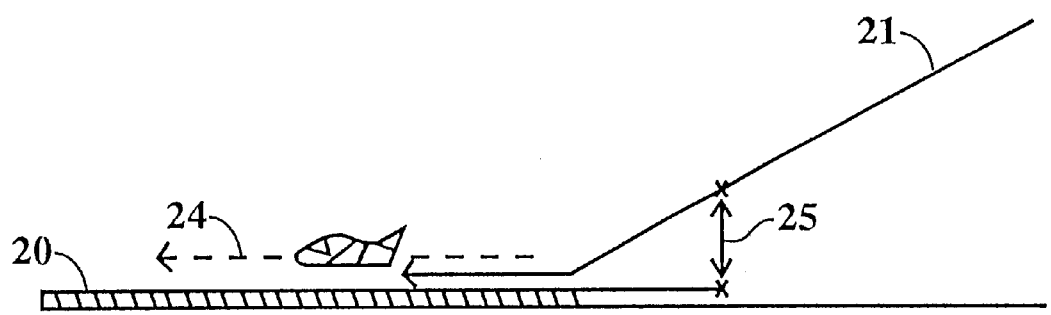
FIG. 2B shows a side view of the airport runway relative to the flight path of the aircraft from FIG. 2A.
Figure 2C:
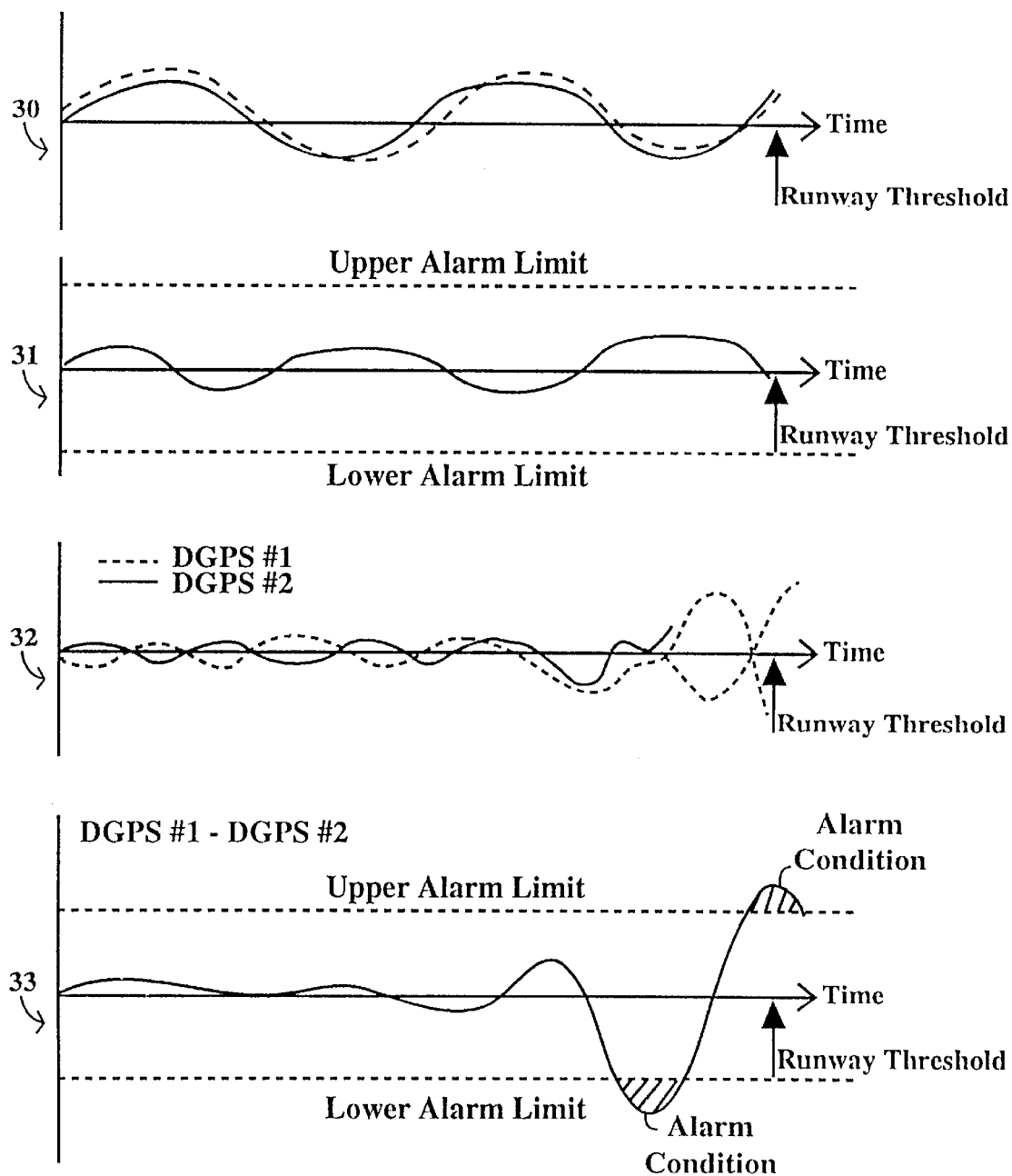
FIG. 2C shows graphs of the angular error of two ILS receivers and graphs of the angular error of two DGPS receivers with respect to the limits of an autopilot system.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to unnecessarily obscure aspects of the present invention.

The present invention comprises a precision approach capable dual differential global positioning system (DGPS) receiver avionics system. The present invention provides a method and system for employing GPS for CAT-III auto landings which do not require locating equipment off of the airport property. The present invention further provides a system for employing GPS which interfaces with existing autopilot systems currently installed in the fleet. The low noise characteristics of the present invention do not cause an inordinate amount of autopilot fault declarations. In addition, the avionics system of the present invention provides a method and system of utilizing GPS and its benefits while retaining the stringent CAT-III certification standards of prior art CAT-III dual ILS systems. The present invention and its benefits are further described below.

Typical GPS receivers utilize code phase measurements to determine position. Code phase measurements tend to be noisy. The aircraft autopilot compares the solutions determined by the DGPS receivers and declares a fault if the solutions are out of agreement, i.e., not proximate within tolerances. If the DGPS receivers violate proximity tolerance, the autopilot declares a fault, aborting any approach the aircraft may have been on. Typical code phase measurements are noisy enough that the DGPS receivers would cause an out of tolerance fault a large percentage of time, using the tolerance thresholds associated with ILS. This is due to the different nature of error sources of the prior art dual ILS receivers and the error sources of DGPS.

In comparing the different error characteristics of ILS and DGPS, it should be appreciated that ILS receivers measure angular deviation as opposed to spatial deviation, and angular accuracy is relatively consistent throughout the approach. Thus the spatial ILS accuracy improves linearly as the aircraft approaches the runway. Accordingly, the inaccuracy of ILS is proportional to the distance from the ILS antenna (e.g., the elevation antenna with respect to vertical guidance), which is located beside the runway approximately at the touchdown point. However, DGPS has a spatial accuracy which is invariant with respect to distance from the runway. GPS is as accurate several miles out from touchdown as it is near touchdown.

The purpose of the comparison of the two ILS receivers is to detect a failure in one of the receivers. The ILS ground station includes a monitor that shuts down the ILS facility if the angular error as sensed at the monitor exceeds some threshold value, or if the signal is so corrupted that the monitor receiver is not receiving valid ILS signals. This ensures that the ILS signal in space has no systematic bias errors.

ILS also has other errors that the monitor can not detect, for example, multi path errors, which are caused by reflections from the ground and from nearby buildings. These errors are characterized and controlled by conducting flight tests during the time the facility is commissioned. This method works because such errors (e.g., multi path) are repeatable. Hence, if multi path errors are small enough during the flight tests, they will be small enough at other times. Of course, a large aircraft or vehicle coming too close to the antenna can cause problems, so protection. zones are set up around the antennas to prohibit entry into those areas.

Also, if a new building is constructed nearby, the whole facility may have to be recommissioned.

Anther possible source of errors is interference, and interference could in principle affect both ILS receivers in the same manner. However, analysis indicates that it would take a deliberate "spoofing" device to do this, and interfering sources would generally cause a loss of function, but not erroneous indications. Interference is controlled by limiting access to areas on the airport surface, and by legal means for fixed transmitters like FM and TV stations. In this manner the integrity of the ILS facility is controlled.

To achieve the same level of integrity for DGPS requires an equally thorough analysis of failure mechanisms. Interference has a very similar effect on DGPS receivers as on ILS receivers, although the details are different. For example, unintentional interference generally causes a loss of function, but not erroneous guidance indications.

DGPS multipath is a primary source of error. DGPS multi path differs from ILS in that it varies over time. However, it is repeatable on a daily basis, and can be evaluated at commissioning time. As with ILS, changing the environment may require recommissioning. Airborne multipath is potentially more of a problem with DGPS than with ILS, but analysis and testing on aircraft have shown that it is not generally a problem. As with ILS, ground monitoring detects DGPS errors (e.g., satellite errors, such as data errors, timing errors, signal dropouts, and multipath caused by intruding vehicles).

What remains to be monitored in order to guarantee integrity of the guidance at a high level of probability is the set of failures that might take place within the airborne DGPS receiver. DGPS receiver noise is monitored by requiring the receiver to measure the satellite signal variations, and to utilize the satellite geometry, the variations in each of the satellites, the uncertainty in the ground station measurements (which are transmitted to the aircraft), and to compute an uncertainty level in vertical and lateral position. In this manner, as described above, with a prior art DGPS system, an unduly high noise level will cause signal variations which would trigger a warning, resulting in an unacceptably high uncertainty level.

Other errors include the slowly varying errors in the code phase measurements. Slowly varying pseudorange errors could be caused by any of the following sources:

1. Ephemeris errors: To compute the pseudorange, one must compute the location of the satellite, which is derived from orbital parameters contained in the satellite data messages. If such an error were caused by a problem in the satellite, the ground station or monitor would detect it. However, if the receiver itself mis-read the ephemeris, it could cause erroneous guidance that could last for 30 seconds. While the satellite message has a parity scheme to prevent this, it is not fool-proof and there is still an unacceptably high probability that this could happen. It is also possible that during acquisition of a low-lying satellite, it could lock on temporarily to a wrong, but stronger, satellite signal, a phenomenon known as "false lock on a cross-correlation peak".
2. Software errors: Programming errors could cause erroneous measurements, but these are controlled by requiring a rigid software development and testing methodology.
3. Processor errors associated with processor hardware failures. These are unlikely to cause slowly varying errors in the measurements, because with 5–10 different new measurements per second, they would either cause data "spikes", or cause highly variable errors, either of which would be detected by measurement consistency or noise tests. Corruption of the ephemeris parameter however, would be problematical.

Thus, comparison of the outputs of two DGPS receivers would detect the following failures:

1. One receiver mis-reads the ephemeris of a satellite.
2. If the receivers are dissimilar, e.g., manufactured by different companies, a software error in one receiver.
3. One receiver has a processor hardware failure that corrupts the ephemeris calculation of one satellite.
4. One receiver has an undetected "cycle slip".

The system of the present invention correctly detects and each of the above failure types.

The DGPS receivers of the present invention are adapted to employ carrier aiding to smooth the code phase measurements used in determining the position of the aircraft. This carrier aiding reduces the noise in the DGPS determined position measurements, however, it is not sufficient to eliminate erroneous fault declarations by the autopilot. To eliminate erroneous fault declarations, the present invention utilizes differential carrier phase tracking along the final portion of a precision approach. Within a predetermined range along the approach path of the aircraft and when the position determined by the first DC-PS receiver and the position determined by the second DGPS receiver are approximate within tolerance (e.g., a predetermined distance chosen to be within the tolerance of the autopilot), the DGPS receivers determine a transition point. After the transition point, the DGPS receivers utilize DGPS carrier phase tracking to determine the position of the aircraft.

Code phase measurements have relatively high variations (e.g., on the order of a meter), but provide measurements relative to the earth. Carrier phase measurements, on the other hand, have very low variations (e.g., on the order of centimeters or less), but do not provide measurements relative to the earth; however, they do provide centimeter-level accuracy relative measurements in time. That is, if the location of the aircraft antenna were known exactly at one point in time, differentially corrected carrier phase measurements would provide centimeter-level accuracy thereafter.

Similarly, if two receivers were connected to the same aircraft antenna, and the location of the aircraft antenna were known exactly at one point in time, their differentially corrected carrier phase measurements would agree within centimeters thereafter, as long as no failure or undetected cycle slip occurred in one receiver. Thus a continuous comparison of relative position derived from differentially corrected carrier phase measurements would detect all four possible failure modes.

However, having a separate carrier phase monitor would not be an "ILS drop-in". Accordingly, the question is how one could implement a scheme such that the autopilot sampling the final position outputs would detect these failures. The system of the present invention accomplishes this by locking the code-phase derived position on both units to a common value (corrected for antenna displacement), either the primary receiver or, if the autopilot averages the reading, the average of the two, using the reasonable assumption that no receiver failure had occurred to that point because of the agreement between the receivers. Then from that point on, the carrier-phase-derived position relative to that initial position would be output from each receiver. Thus comparison of the two position outputs would detect the failure types described above.

The system of the present invention functions well because a ILS "look-alike" signal must be angular in nature, not linear. That is, deviations from the desired path are measured by DGPS in units of length, e.g., meters, while the ILS-like outputs need to be in units of angle, e.g., degrees. This means that a meter of error 5 miles from touchdown translates to 0.006 degrees, while at 0.35 miles, when the aircraft is at 100 feet above the runway, a meter translates to 0.088 degrees. The threshold used by the autopilot is typically about 0.01 degrees, which translates to about 10 centimeters at 100 feet above the runway. Two DGPS receivers using the relative differential carrier phase measurements, in accordance with the present invention, would track each other within this tolerance unless there were a real failure involved. In this manner, the system of the present invention allows the execution of precision approaches with no greater false alarm rate than conventional, prior art ILS systems.

Figure 3A:
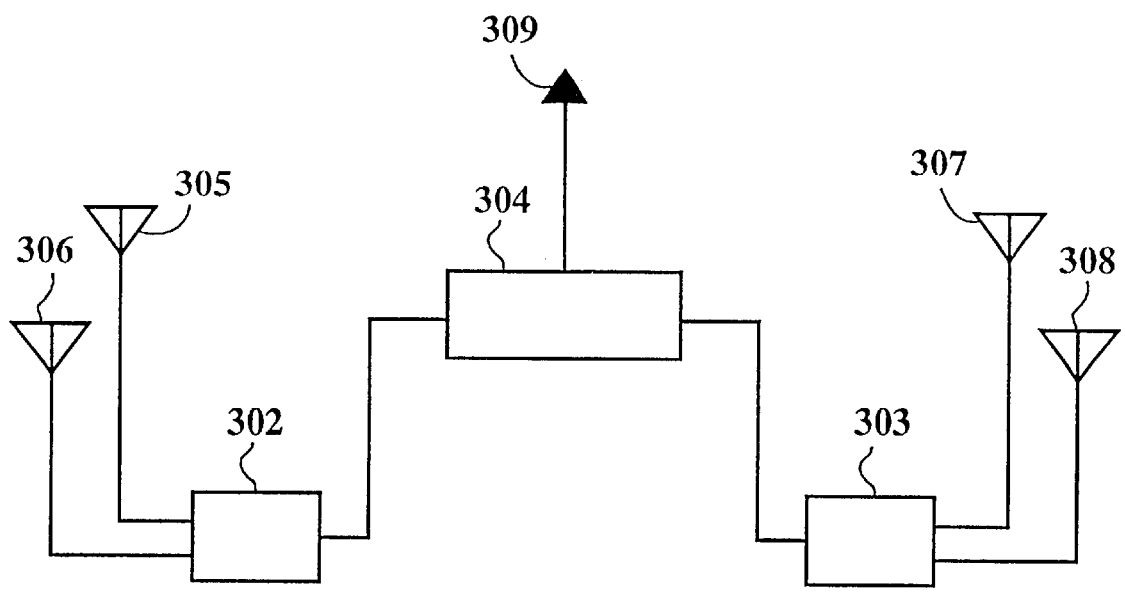
FIG. 3A shows a schematic diagram of the precision approach capable dual DGPS receiver avionics system of the present invention.
Figure 3B:
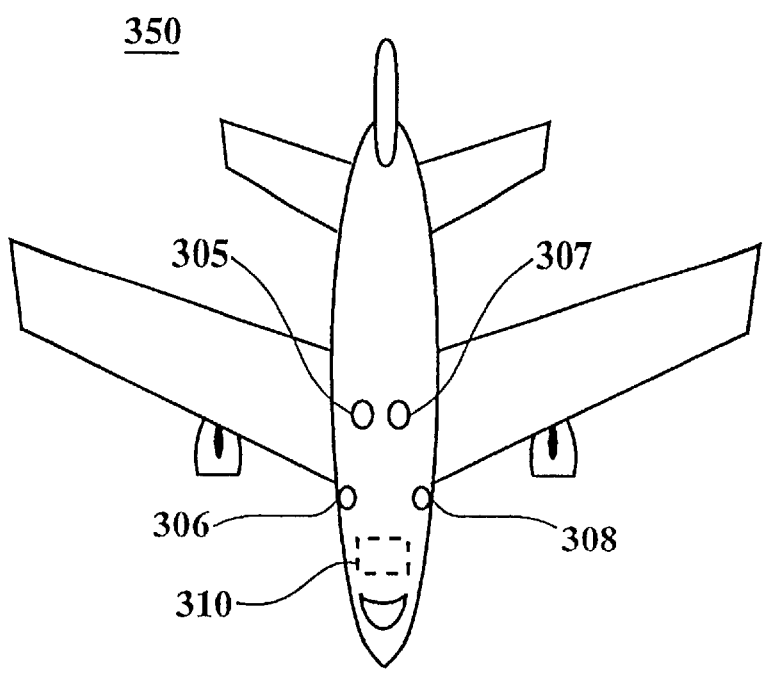
FIG. 3B shows an aircraft including the avionics system of the present invention.

FIG. 3A show a schematic diagram of the precision approach capable dual DGPS receiver avionics system 300 (hereafter avionics system) of the present invention and FIG. 3B shows an aircraft 350 including the avionics system 300. The avionics system 300 includes a DGPS receiver 302 and DGPS receiver 303, both coupled to an comparator unit 304. DGPS receiver 302 is coupled to GPS antenna 305 and differential correction antenna 306. DGPS receiver 303 is coupled to GPS antenna 307 and differential correction antenna 308. Avionics system 300 is coupled to an autopilot (not shown) via an interface 309.

In FIG. 3B, the system of present invention is located, for example, in the avionics bay 310 beneath the flight deck of aircraft 350. GPS antenna 305 and GPS antenna 307 are mounted on the upper surface of the fuselage of aircraft 350. Differential correction data link antenna 306 and data link antenna 308 are also mounted on the fuselage such that they can clearly receive differential correction signals from a ground based reference station. Antenna placement is dictated by signal reception. Signal reception is subject to many variables, such as the aircraft's shape and size, the location of radio transmission antennas, and other protrusions on the aircraft. These variables change from aircraft type to aircraft type. As such, it should be appreciated that the mounting location and configuration of the components of avionics system 300 is aircraft type dependent. GPS antennas 305 and 307, and differential correction antennas 306 and 308, are mounted on the aircraft such that they clearly receive GPS signals and differential correction signals respectively. GPS signals are received from GPS satellites in orbit while differential correction signals are received from reference stations located at the various DGPS capable airports (e.g., airports having co-located reference stations).

Referring still to FIG. 3A and FIG. 3B, in the present embodiment, avionics system 300 is designed to be a direct replacement for prior art dual ILS systems equipping many aircraft. Dual ILS systems are typically built as an integral electronics unit. The units are mounted into racks in the avionics bay of the aircraft. Avionics System 300 is sized to mount in the same location and utilize the same enclosure hardware as typical prior art dual ILS systems. Avionics system 300 interfaces with the autopilot via interface 309. It should be noted that while on an approach, avionics system 300 provides navigation data in the same angular format as the prior art dual ILS systems. In this manner, avionics system 300 directly replaces prior art dual ILS systems while requiring minimal modification of mounting hardware or aircraft autopilots.

DGPS receiver 302 and DGPS receiver 303 each determine the present position of GPS antennas 305 and 307, respectively. DGPS receiver 302 and DGPS receiver 303 (hereafter DGPS receivers 302–303) utilize uncorrected GPS signals to determine uncorrected GPS positions. Uncorrected GPS positions are typically accurate to within 100 meters 95% of the time. This level of accuracy is sufficient for enroute navigation. DGPS receivers 302–303 utilize differential corrections received via differential correction antennas 306 and 308 respectively, to increase accuracy to within 1 meter. Thus, DGPS receivers 302–303 are each more accurate than typical prior art ILS receivers. This level of accuracy is required for precision approaches, including CAT-III approaches.

Prior art CAT-III ILS systems used in newer aircraft employ dual ILS receivers for added redundancy and fault detection. For the last halfmile or so before landing, the autopilot compares the outputs of the two ILS receivers, and if they disagree by more than a certain predetermined amount, a fault is declared, and the aircraft must declare a missed approach. The CAT-III ILS systems are routinely accurate to within 2 ft in the vertical dimension 95% of the time at the runway surface. They are required to work under extreme weather conditions and at life-critical levels of performance (e.g., probability of missed detection of failure not exceeding $5 \times 10^{-9}$). The avionics system 300 of the present invention performs to this standard.

In the present embodiment, receiver unit 301 contains two separate DGPS receivers, DGPS receivers 302–303, each independent of the other. DGPS receiver 302–303 each have their separate components (e.g., GPS antennas 305 and 307) and each determine vertical and lateral deviations independently. This provides the required degree of redundancy and fault detection. The autopilot of aircraft 350 compares the outputs of DGPS receivers 302–303 via autopilot interface 309. If the deviation outputs of DGPS receivers 302–303 differ by more than a predetermined amount, the autopilot of aircraft 350 declares a fault, as described above. The predetermined amount is based upon the criteria used to judge the integrity of prior art CAT-III dual ILS systems. In matching the specifications of the prior art CAT-III dual ILS systems, the avionics system of the present invention overcomes the noise characteristics of GPS.

Figure 4A:
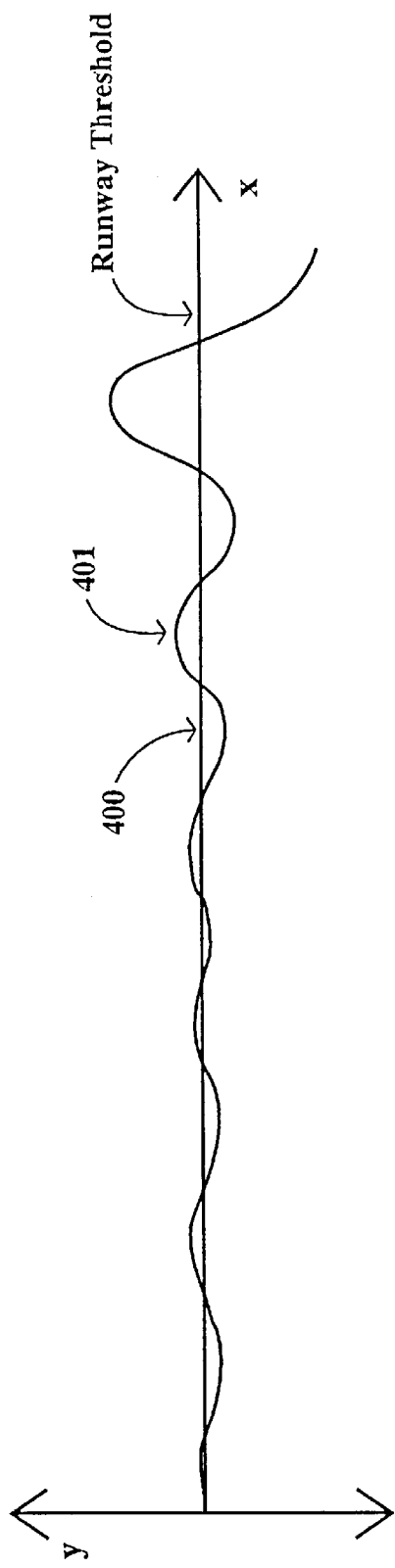
FIG. 4A shows a graph of code phase determined GPS position measurements with respect to time.

Referring now to FIG. 4A, a graph of DGPS deviation errors in the vertical dimension versus time is shown. Vertical deviation error is shown on the y axis and time is shown on the x axis. Line 400 represents the true position (i.e., zero error) and line 401 represents a DGPS deviation error. Code phase measurements tend to be noisy. Even with differential corrections, the nature of the pseudorange signal inherently leads to deviation measurements which appear to randomly vary about the true absolute position. A perfectly functional DGPS receiver thus experiences a noise-like variation in the position it measures. Thus, line 401, the code phase based position, varies within a range about line 400, the absolute position. Unlike DGPS signals, uncorrected GPS signals (the SPS signals) result in large variations about an absolute position. Differentially corrected GPS leads to much smaller variations, e.g., line 401, and the variation tends to appear predominately random.

Figure 4B:
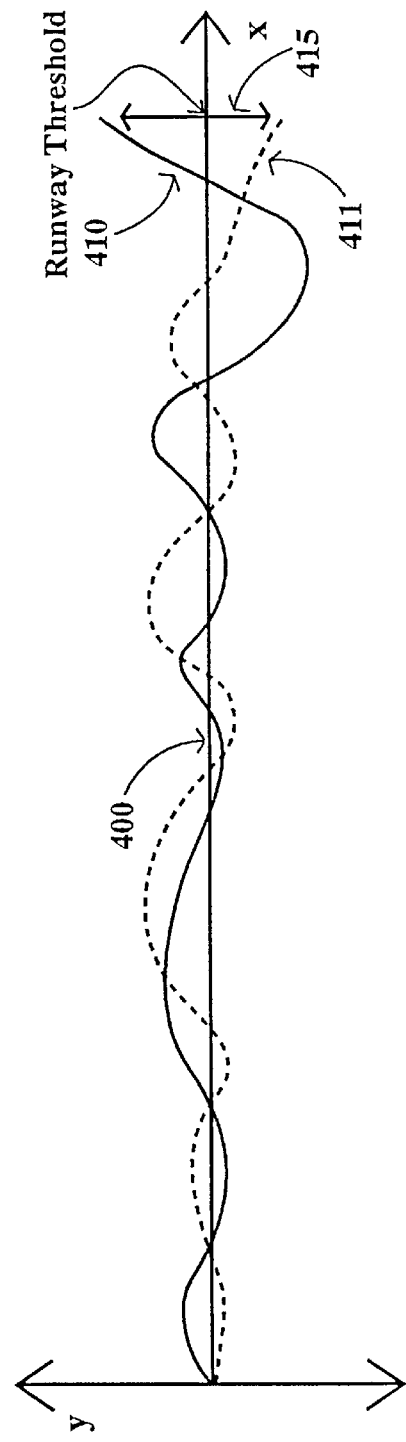
FIG. 4B shows a graph of two code phase determined GPS position measurements with respect to time.

Referring now to FIG. 4B, a graph of two DGPS deviation errors in the vertical dimension versus time are shown. Line 410 represents the errors associated with a first DGPS receiver and line 411 represents the errors associated with a second DGPS receiver. Deviation 411 both vary about the absolute position, line 400, in a substantially random manner. Even though the first DGPS receiver and the second DGPS receiver both utilize the same GPS satellites in view and the same differential correction signal, their respective deviation errors, i.e., 410 and 411, exhibit different behavior.

The maximum variation between measurement 410 and the maximum variation of measurement 411 from the absolute position is within the required accuracy tolerance, however, measurement 410 and measurement 411 often exceed proximity tolerance. As discussed above, an aircraft autopilot compares the deviation outputs of two DGPS receivers and declares a fault if the deviation outputs are not proximate within a predetermined amount. Line 415 represents an out of tolerance condition with respect to the first and second DGPS receivers.

The DGPS receivers 302–303 of the present invention are adapted to employ carrier aiding to smooth the code phase measurements used in determining position and reduce the effects of code-phase noise. Carrier aiding is a technique well known in the GPS navigation electronics industry, and is often used on high-end DGPS systems to decrease the apparent noise of DGPS determined positions, and as a result, increase accuracy. Carrier aiding effectively reduces the noise of the code phase-based positions, however, carrier aiding does not sufficiently reduce the number of fault declarations by the autopilot. There are still an unacceptably large number of out of tolerance conditions, e.g., line 415.

Figure 4C:
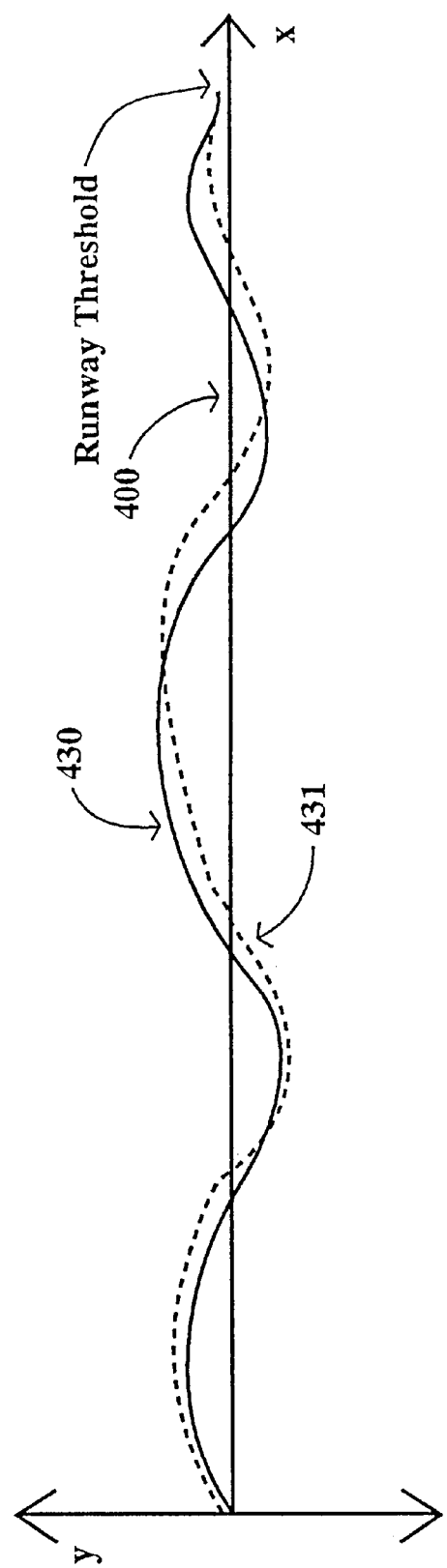
FIG. 4C shows a graph of two ILS determined position measurements with respect to time.

Referring now to FIG. 4C a graph of ILS determined position measurements in the vertical dimension versus time are shown. Line 430 represents a position measurement of a first ILS receiver and line 431 represents a position measurement of a second ILS receiver. ILS relies upon the relative position of the ILS antenna in two ILS radio reference beams, a glide slope beam and a localizer beam. ILS information is angular in nature. Thus, ILS decreases in accuracy the farther away the aircraft is from the ILS antenna. Additionally, ILS signals are subject to transmission interference from obstacles, such as large taxiing aircraft or large metal buildings. Even when very near the airport runway, ILS can be less accurate than DGPS determined positions. ILS receivers, however, exhibit very low noise characteristics. Thus, position measurement 430 from the first ILS receiver tracks very closely with position measurement 431 from the second ILS receiver, even though ILS position measurements are comparatively less accurate than DGPS position measurements, as shown by the comparatively larger maximum variation of position measurements 430 and 431 from absolute position 400.

Figure 5A:
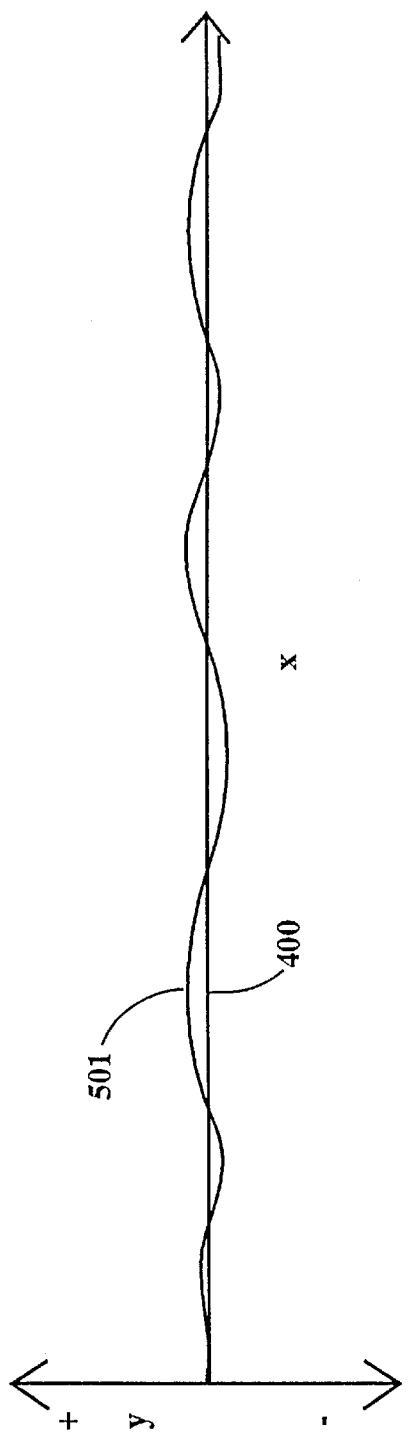
FIG. 5A shows a graph of carrier phase determined position measurements with respect to time.

Referring now to FIG. 5A, a graph of carrier phase determined position measurements in the vertical dimension verses time are shown. Line 501 represents the carrier phase measurement of a DGPS receiver. Absolute position is represented by line 400. Position measurement 501 shows the relative accuracy and the relative amount of noise present in carrier phase-based DGPS position measurements in comparison to code phase-based DGPS position measurements 401 of FIG. 4A. Carrier phase measurements exhibit much lower noise in comparison to code phase measurements. Carrier phase measurements are also much more accurate than code phase measurements. The low noise characteristics of carrier phase tracking allows the solutions of the DGPS receivers 302–303 to remain proximate within tolerance of the autopilot.

Figure 5B:
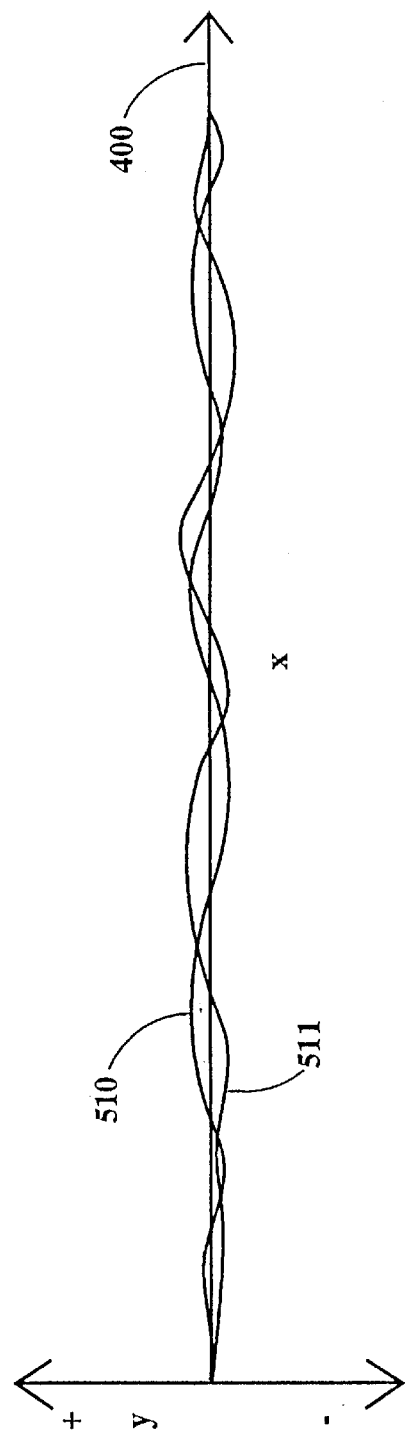
FIG. 5B shows a graph of two carrier phase determined position measurements with respect to time.

Referring now to FIG. 5B a graph of two carrier phase determined DGPS position measurements in the vertical dimension verses time are shown. Line 510 represents the carrier phase measurements of a first DGPS receiver and line 511 represents the carrier phase measurements of a second DGPS receiver. Measurement 510 and measurement 511 both exhibit the very low noise characteristics of carrier phase measurement, and show very little variation about the absolute position line 400. Thus, the outputs of the DGPS receivers measuring position using carrier phase tracking remain proximate.

Carrier phase measurements, however, can be problematic to work with in real-time. The problem with carrier phase tracking is the fact that the solutions are ambiguous. Carrier phase measurements can be used in applications where the relative motion of the satellites of the GPS constellation resolve the ambiguities (e.g., surveying applications), where essentially, the ambiguities are resolved by observing the ambiguous solutions over a period of several minutes and tracking the effects of changing GPS satellite geometry. Constellation observations over a period of time, however, are not suited to the dynamic, real time nature of precision approach flying. Other prior art solutions utilized pseudolites placed under the airport's approach path, with the disadvantage of the requirement of placing the pseudolites outside the boundaries of the airport. The avionics system 300 of the present invention provides solution to the carrier phase ambiguity problem.

Figure 6:
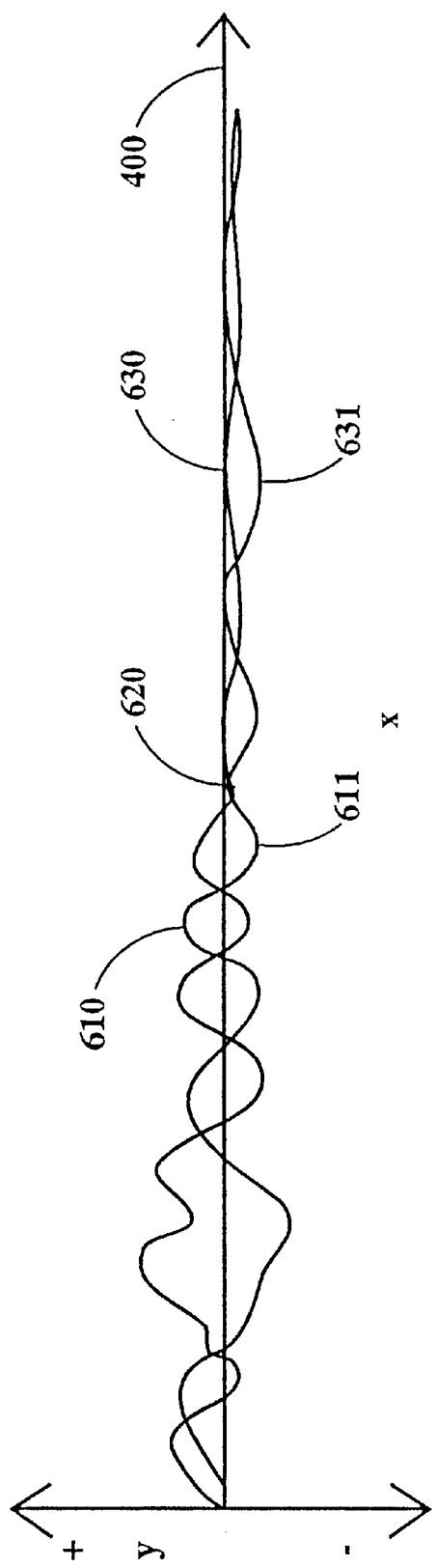
FIG. 6 shows a graph illustrating the carrier phase tracking process of the present invention.

With reference now to FIG. 6, a graph illustrating the carrier phase tracking process of the present invention is shown. Line 610 represents the code phase measurements of DGPS receiver 302 and line 611 represents the code phase measurements of DGPS receiver 303. Measurement 610 and measurement 611 both exhibit the code-phase noise characteristics discussed above. The avionics system of the present invention, however, determines a transition point 620 where subsequent positions use only carrier phase measurements. Subsequent to the transition point 620, carrier phase measurements of DGPS receiver 302, represented by line 630, and carrier phase measurements of DGPS receiver 303, represented by line 631, exhibit the low noise characteristics of carrier phase tracking, and thus show very little variation about the absolute position, line 400. In this manner, the outputs of the DGPS receivers 302–303, after the transition point, remain proximate within the tolerance of the autopilot of aircraft 350 (FIG. 3B).

It should be appreciated that, as described above, the purpose of the autopilot comparison of DGPS receivers 302–303 is to detect a failure in one of the receivers. There are at least two methods, for example, in which this can be done. In one method, one receiver (e.g., receiver 302) is treated as the "primary", and drives the autopilot, while the second receiver (e.g., receiver 303) is "secondary", and serves only as an integrity monitor on the primary. In the second method the autopilot guidance is based on the average of the two DGPS receivers 302–303, adjusted for the antenna separation.

When the aircraft is several miles out from the runway, the equivalent angular accuracy of DGPS is much better than ILS, so that when the DGPS receivers 302–303 are operating properly, their angular outputs will agree very well, and will not trigger the autopilot alarm. The proposed technique takes advantage of this by establishing two segments in the approach to achieve very high confidence that both DGPS receivers 302–303 are operating properly. In the first segment the DGPS receivers 302–303 are running independently use carrier-aided code phase measurements, and the secondary receiver compares its position with the primary. At about 3–5 miles out from touchdown, if the DGPS receivers 302–303 agree within pre-established limits, indicating that no failure has occurred, the secondary resets its position measurement to that of the primary (or to an average, or some other combination, of the two), and subsequently both receivers utilize differentially corrected carrier phase measurements during the second segment, and ignore further code phase measurements. Very high integrity is maintained during the second segment by the autopilot comparing the equivalent angular output of the DGPS receivers 302–303. Since both DGPS receivers 302–303 have the same position at the transition point and subsequently output position based on carrier phase, they will track within 5 centimeters or so. Thus, they will not trigger an autopilot alarm unless a real failure in one receiver has occurred.

It should be noted that the carrier phase tracking process of the present invention does not resolve the carrier phase ambiguities (often referred to as cycle ambiguities). The carrier phase measurements are not used to determine present position. The avionics system of the present invention uses carrier phase measurements to determine the change in position rather than the absolute position. The DGPS receivers 302–303 utilize carrier aiding to smooth the code phase measurements. In so doing, DGPS receivers 302–303 continually average code phase measurements over the last several seconds to help filter out noise. Carrier phase measurements are utilized to account for the change in position of the aircraft over the averaging time period. In this manner, the noise characteristics of the code-phase measurements are reduced, however, as described above, the code-phase measurements are still noisy enough to cause out of tolerance conditions (e.g., FIG. 4B).

Referring now to FIG. 7A and FIG. 7B, a down view of aircraft 350 flying a CAT-III precision approach and a side view of aircraft 350 flying the CAT-III precision approach to a runway 710, are respectively shown. A DGPS reference station 700 is located near runway 710. Line 701 and line 702 represent the respective left and right nominal range of the localizer of the CAT-III approach. Line 703 and line 704 represent the respective upper and lower range of the glide slope of the CAT-III approach. It should be appreciated that the CAT-III approach is based upon ILS. Thus, since ILS is based upon angular measurement, the nominal range in both azimuth (FIG. 7A) and elevation (FIG. 7B) for the approach decreases as the aircraft 350 proceeds closer to the runway 710.

Referring still to FIG. 7A and FIG. 7B, the present invention places the transition point 620 within a predetermined range 720 along the approach path 730 of the aircraft 350. The location of the transition point also depends upon when the position determined by the first DGPS receiver 302 and the position determined by the second DGPS receiver 303 are proximate within tolerance, in the manner described above. After the transition point 620, the DGPS receivers 302–303 utilize DGPS carrier phase tracking to determine the position of the aircraft 350. It should be appreciated that the transition point 620 should not be located exceedingly far (e.g., more than 10 miles) from the runway 710. In addition, transition point 620 should be far enough away such that the autopilot alarm is not triggered. As such, the exact size and location along flight path 730 of predetermined range 720 may vary.

In the present embodiment, much of the required data processing is performed within comparator 304 (from FIG. 3A). It should be appreciated, however, that the processing required to implement the present invention (e.g., transition point placement, comparison of the two DGPS receivers, etc.) can be performed within any one or combination of systems comprising the present invention. Such systems include, for example, the DGPS receivers (e.g., DGPS receivers 302–303), the comparator (e.g., comparator 304), the autopilot, a coupled, external computer system, or the like.

Thus, the present invention allows aircraft 350 to safely fly the CAT-III approach. CAT-III allows flight right down to the runway surface (decision height of 0 ft) with very restricted runway visual range (RVR). The avionics system 300 (FIG. 3A) is accurate to within 2 m in the vertical dimension 95% of the time. Precision approach capable dual DGPS receiver avionics systems in accordance with the present invention should work under the extreme weather conditions and at life-critical levels of performance (e.g., probability of missed detection of failure not exceeding $5 \times 10^{-9}$) expected of CAT-III systems.

The present invention provides these benefits without requiring the location of equipment off of the airport property. The present invention employs GPS while interfacing with existing autopilot systems currently installed in the fleet, and without causing false autopilot fault declarations. By not changing autopilot thresholds or ILS accuracy standards, the resent invention providing the benefits of GPS while retaining the stringent CAT-III certification standards of prior art CAT-III dual ILS systems. Expensive recertification of autopilots will not be required.

Figure 8:
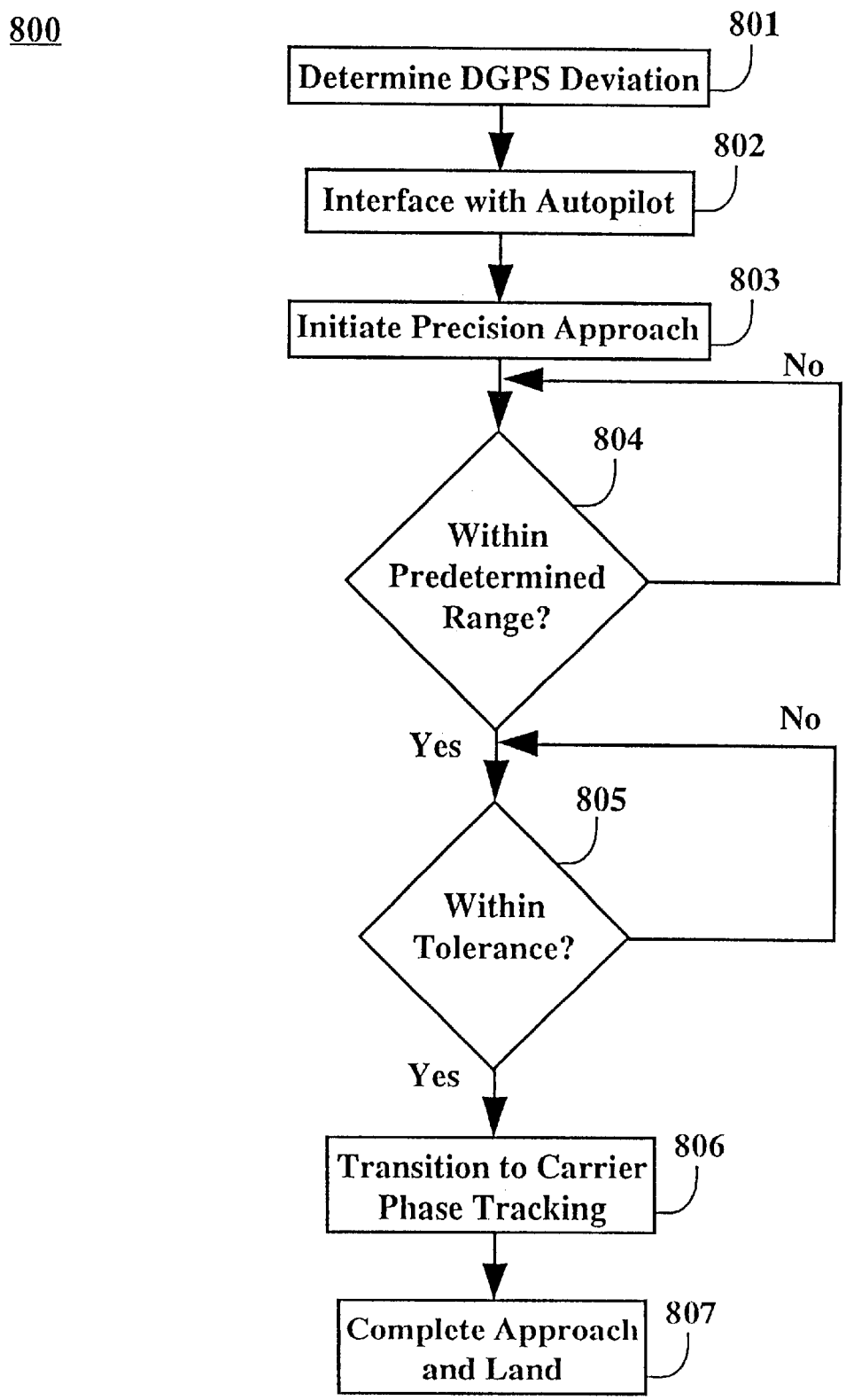
FIG. 8 shows a flow chart of the steps of the process of the present invention.

Referring now to FIG. 8, a flow chart of the steps of the process 800 of one embodiment of the present invention is shown. The process 800 begins in step 801 where an aircraft, including the precision approach capable dual DGPS receiver avionics system of the present invention (hereafter avionics system), is in flight at enroute altitudes. The avionics system determines conventional DGPS position utilizing differential corrections from ground stations. In step 802, the avionics system provides steering to the autopilot of the aircraft as the aircraft navigates through the NAS. In step 803, the aircraft initiates a precision approach to an airport and the avionics system provides position based on DGPS from a ground station located at the airport. In step 804, the avionics system determines whether the aircraft has entered a predetermined range along the approach path, wherein the avionics system is able to transition to carrier phase tracking, as described above. When the aircraft is within the predetermined range, in step 805 the avionics system determines whether the PVT outputs of a first and second DGPS receiver included in the avionics system are proximate within a predetermined distance, in the manner described above. When the output of the first DGPS receiver and the output of the second DGPS receiver are sufficiently proximate, the avionics system transitions to carrier phase tracking, step 806.

In step 806, the avionics system utilizes carrier phase tracking to track the PVT of the aircraft as it continues along the approach path. As described above, carrier phase measurements have very low noise characteristics, ensuring the approach can be completed without causing a fault declaration by the autopilot. In step 807, the avionics system allows the aircraft to complete the precision approach by providing accurate, low noise, and reliable guidance information to the autopilot of the aircraft. At the same time, real faults or failures within one receiver will trigger the autopilot alarm, as it should. The guidance information meets CAT-III standards.

Thus the present invention provides a method and system for employing GPS for CAT-III auto landings which do not require locating equipment off of the airport property. A conventional DGPS transmitter is located within the bounds of the airport. The present invention further provides a system for employing GPS which will interface with existing autopilot systems currently installed in the fleet. The low noise characteristics of the present invention do not cause an inordinate amount of autopilot fault declarations. The avionics system of the present invention is adapted to fit into a space occupied by conventional dual ILS systems, and is adapted to provide data in the same angular format as the conventional dual ILS receivers. In addition, the avionics system of the present invention provides a method and system of utilizing GPS and its benefits while retaining the stringent CAT-III certification standards of prior art CAT-III dual ILS systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A dual differential global positioning system (DGPS) receiver avionics system, comprising:
   a first DGPS receiver adapted to employ carrier aiding to smooth code-phase pseudorange measurements to determine a first position;
   a second DGPS receiver adapted to employ carrier aiding to smooth code-phase pseudorange measurements to determine a second position, said first DGPS receiver and said second DGPS receiver included in an avionics system in an aircraft; and
   said first DGPS receiver and said second DGPS receiver adapted to utilize carrier phase tracking such that said first position and said second position remain proximate within said predetermined distance and such that said first DGPS receiver and said second DGPS receiver generate consistent position information for said aircraft.

2. The system of claim 1 further comprising:
   said first DGPS receiver and said second DGPS receiver combined into said avionics system such that said avionics system mounts in an ILS standard mounting location and uses ILS standard mounting hardware.

3. The system of claim 1 wherein said consistent position information is coupled to an autopilot of said aircraft.

4. The system of claim 3 wherein said autopilot is adapted to use said consistent position information to cause said aircraft to execute a precision approach.

5. The system of claim 3 further comprising:
   said first DGPS receiver adapted to output said first position and said second DGPS receiver adapted to output said second position in an angular format consistent with ILS.

6. The system of claim 3 further comprising:
   said first DGPS receiver adapted to track a first carrier phase based position measurement such that a first output to said autopilot exhibits lower noise than a first code phase based position measurement;
   said second DGPS receiver adapted to track a second carrier phase based position measurement such that a second output to said autopilot exhibits lower noise than a second code phase based position measurement; and
   said first output and said second output proximate within said predetermined distance.

7. The system of claim 1 further comprising:
   said first DGPS receiver and said second DGPS receiver adapted to utilize a differential correction signal from a DGPS reference station.

8. The system of claim 1 further comprising:
   said first DGPS receiver and said second DGPS receiver adapted to utilize signals from a wide area augmentation system satellite.

9. The system of claim 1, wherein said first DGPS receiver and said second DGPS receiver are certified to a Federal Aviation Administration Category III standard.

10. The system of claim 1, wherein said initial position is a code phase pseudo range based position.

11. The system of claim 1, wherein said initial position is coincident with said first position or said second position.

12. A differential global positioning system (DGPS) receiver avionics system, comprising:
    a first DGPS receiver, said first DGPS receiver adapted to determine a first position;
    a second DGPS receiver, said second DGPS receiver adapted to determine a second position, said first DGPS receiver and said second DGPS receiver coupled to an aircraft; and
    said first DGPS receiver and said second DGPS receiver adapted to determine said first position and said second position utilizing code phase-based position measurements, said first DGPS receiver and said second DGPS receiver adapted to track said first position and said second position utilizing carrier phase tracking such that said first position and said second position remain proximate along a flight path of said aircraft.

13. The system of claim 12, wherein said first DGPS receiver and said second DGPS receiver are certified to a Category III standard such that an autopilot included in said aircraft can interface with said first DGPS receiver and said second DGPS receiver to execute a Category III approach.

14. The system of claim 12, further comprising:
    said first DGPS receiver and said second DGPS receiver combined into a dual DGPS avionics system such that said avionics system mounts in an ILS standard mounting location and uses ILS standard mounting hardware.

15. The system of claim 12, further comprising:
    said first DGPS receiver adapted to output said first position and said second DGPS receiver adapted to output said second position in an angular format configured to interface an autopilot of said aircraft.

16. The system of claim 12, further comprising:
    said first DGPS receiver adapted to track a first code phase based position measurement using carrier phase tracking such that a first output to an autopilot of said aircraft exhibits lower noise than said first code phase based position measurement;
    said second DGPS receiver adapted to track a second code phase based position measurement using carrier phase tracking such that a second output to said autopilot exhibits lower noise than said second code phase based position measurement; and
    said first output and said second output proximate within said predetermined distance.

17. The system of claim 12, further comprising:
    said first DGPS receiver and said second DGPS receiver adapted to utilize a differential correction signal from a DGPS reference station.

18. The system of claim 12, further comprising:
    said first DGPS receiver and said second DGPS receiver adapted to utilize a differential correction signal from a wide area augmentation system satellite.

19. A differential global positioning system (DGPS) receiver avionics system, comprising:

a first DGPS receiver, said first DGPS receiver adapted to determine a first position;

a second DGPS receiver, said second DGPS receiver adapted to determine a second position; and said first DGPS receiver and said second DGPS receiver adapted to determine said first position and said second position utilizing code phase-based position measurements, said first DGPS receiver and said second DGPS receiver adapted to track said first position and said second position utilizing carrier phase tracking such that said first position and said second position remain proximate over a period of time.

20. The system of claim 19 wherein said first DGPS receiver and said second DGPS receiver are combined into an avionics system in an aircraft.

21. The system of claim 20 wherein said first position and said second position are coupled to an autopilot of said aircraft.

22. The system of claim 21 wherein said autopilot is adapted to use said first position and said second position to guide said aircraft on a precision approach.

23. The system of claim 19 further comprising:

said first DGPS receiver adapted to output said first position and said second DGPS receiver adapted to output said second position in an angular format.

24. The system of claim 19 further comprising:

said first DGPS receiver adapted to track a first carrier phase based position measurement such that a first output exhibits lower noise than a first code phase based position measurement; and said second DGPS receiver adapted to track a second carrier phase based position measurement such that a second output exhibits lower noise than a second code phase based position measurement.

25. The system of claim 19 further comprising:

said first DGPS receiver and said second DGPS receiver adapted to utilize a differential correction signal from a DGPS reference station.

26. The system of claim 19 further comprising:

said first DGPS receiver and said second DGPS receiver adapted to utilize signals from a wide area augmentation system satellite.

27. The system of claim 19, wherein said first DGPS receiver and said second DGPS receiver are certified to a Federal Aviation Administration Category III standard.

28. A method for using differential global positioning system (DGPS) receivers for providing positioning information to an aircraft, the method comprising the steps of:

a) determining a first position with a first DGPS receiver via code phase measurement;

b) determining a second position with a second DGPS receiver via code phase measurement;

c) interfacing said first DGPS receiver and said second DGPS receiver to provide steering information to an aircraft;

d) initiating an approach with said aircraft;

e) transitioning to carrier phase tracking wherein said first position is tracked via carrier phase measurement with said first DGPS receiver and said second position is tracked via carrier phase measurement with said second DGPS receiver; and f) comparing said first position and said second position to determine whether said first position and said second position are consistent within a predetermined distance.

29. The method of claim 28, wherein step c) further comprises the steps of:

outputting said first position in an angular format consistent with ILS such that said first DGPS receiver interfaces with an autopilot of said aircraft; and outputting said second position in angular format such that said second DGPS receiver interfaces with said autopilot.

30. The method of claim 28, wherein step e) further comprises the steps of:

determining whether said aircraft is within a predetermined range along an approach path; and transitioning to carrier phase tracking when said aircraft is within said predetermined range.

31. A differential global positioning system (DGPS) receiver system, comprising:

a first DGPS receiver, said first DGPS receiver adapted to determine a first position;

a second DGPS receiver, said second DGPS receiver adapted to determine a second position;

said first DGPS receiver and said second DGPS receiver adapted to determine said first position and said second position utilizing code phase-based position measurements; and said first DGPS receiver and said second DGPS receiver adapted to track said first position and said second position utilizing carrier phase tracking.

32. The system of claim 31 wherein said first DGPS receiver and said second DGPS receiver are combined into an avionics system in an aircraft.

33. The system of claim 32 wherein said first position and said second position are coupled to an autopilot of said aircraft.

34. The system of claim 33 wherein said autopilot is adapted to use said first position and said second position to guide said aircraft on a precision approach.

* * * * *